March 8, 1960 E. T. LUFF 2,927,524
COMBINATION BARBECUER AND INCINERATOR
Filed Jan. 30, 1958 2 Sheets-Sheet 1

INVENTOR,
EARL T. LUFF.
BY

March 8, 1960 E. T. LUFF 2,927,524
COMBINATION BARBECUER AND INCINERATOR
Filed Jan. 30, 1958 2 Sheets-Sheet 2

INVENTOR,
EARL T. LUFF.

United States Patent Office 2,927,524
Patented Mar. 8, 1960

2,927,524

COMBINATION BARBECUER AND INCINERATOR

Earl T. Luff, Lincoln, Nebr.

Application January 30, 1958, Serial No. 712,174

4 Claims. (Cl. 99—421)

This invention relates to portable grills and incinerators in whcih products are barbecued, cooked, burned and smoked, and in particular a vertically disposed housing with a fire-box in the lower portion and a spit spaced above the fire-box, and in which an incinerator basket may be positioned.

The purpose of this invention is to provide a portable grill in which product holding elements may be removed so that the device may also be used as an incinerator.

Various types of portable grills have been provided, particularly for domestic use, however, in addition to the grill the home owner is also required to have an incinerator for disposing of trash.

With this thought in mind this invention contemplates an upright rectangular-shaped housing having a charcoal grate or fire-box spaced upwardly from the lower end, with a spit above the fire-box, and in which the spit may be removed and replaced by an incinerator basket, so that the device may be used either as a grill or barbecuer, or meat smoker, or as an incinerator.

The object of this invention is, therefore, to provide means for constructing a portable grill or barbecuer whereby the product holding elements may be removed and replaced by an incinerator container, so that the device may also be used as an incinerator.

Another object of the invention is to provide a portable barbecuer in which the distance from the product being barbecued to the fire is adjustable.

Another important object of the invention is to provide an incinerator element that is adapted to be used in a portable grill.

It is yet another object of the invention to provide a portable barbecuer in which products being barbecued are readily accessible through doors in the upper part of the barbecuer obviating the necessity of subjecting the hands of the operator to the intense heat of the fire.

A further object of the invention is to provide a combination barbecuer and incinerator in which both the barbecuing and incinerator elements may be stored in the housing of the device when the device is not in use.

A still further object is to provide a combination barbecuer and incinerator which is of a simple and economical construction.

With these and other objects and advantages in view the invention embodies a vertically disposed rectangular-shaped housing having wheels at the front and extended legs at the rear, a charcoal fire-box having a water tank therein removably mounted in a tray adjustably mounted in the housing, a spit rotatably mounted in the upper part of the housing and rotated by a hand crank or motor, a shelf having a handle on the extended end projecting from a rear wall of the housing, a chimney having a damper therein extended from one side of the housing, doors hinged to the housing, and an incinerator basket designed to be installed in the housing with the spit removed.

Other features and advantages of the invention will appear from the following description taken in connection with the drawings, wherein.

Figure 1:
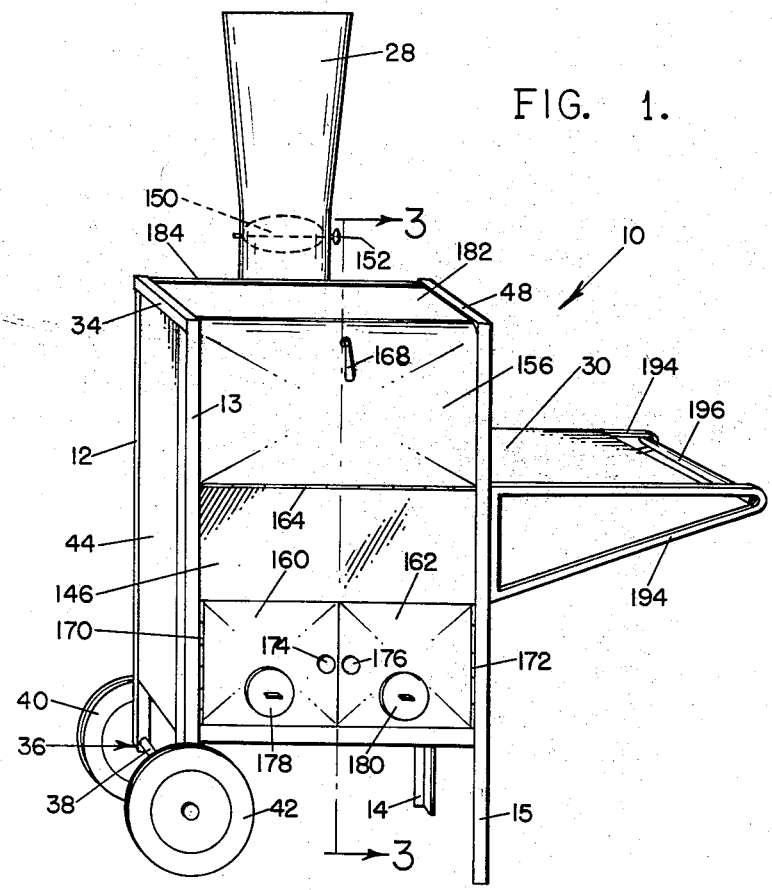
Figure 1 is a side elevational view, in perspective, of the improved combination barbecuer and incinerator.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings and in the following specification, the same reference characters are used to designate the same parts and elements throughout, and in which the numeral 10 refers to the invention in its entirety, numerals 12 and 13 angle bars at the front of the housing, numerals 14 and 15 angle bars at the rear of the housing, numeral 16 a fire-box designed to be positioned in a tray 18 in the lower part of the housing, numeral 20 a spit mounted on a shaft 22 and having prongs 24 and 26, numeral 28 a chimney extended from one side of the housing, numeral 30 a shelf projecting from the rear of the housing, and numeral 32 an incinerator basket designed to be positioned in the housing.

The upper ends of the angle bars 12 and 13, at the front of the housing, are connected by a cross bar 34 and the lower ends stop at the point 36 which is spaced above a floor upon which the housing may be positioned. A shaft 38 is mounted in the lower ends of the angle bars 12 and 13 and wheels 40 and 42 are mounted on ends of the shaft, as shown in Figure 1. A panel 44 is positioned against the inner surfaces of the legs of angle bars 12 and 13 and a similar panel 46 is positioned against the inner surfaces of the angle bars 14 and 15 at the opposite end of the housing. The lower ends of the angle bars 14 and 15 extend to the floor providing legs which coact with the wheels to support the housing in an upright position. The upper ends of the angle bars 14 and 15 are connected by a cross bar 48, and the lower parts of the bars are connected by a similar angle bar 50, which is positioned at the lower edge of the panel 46. A similar angle bar 50 is positioned at the lower edge of the panel 44 and connects the angle bars 12 and 13 at the front of the housing.

The charcoal fire-box or pan is provided with a base 52 having a front wall 54, end walls 56 and 58, and a rear wall 60 extended upwardly therefrom and the upper edge of the rear wall is provided with a flange 62. Similar flanges 64 and 66 are provided on the upper edges of the end walls, and the front wall, the upper edge of which is spaced downwardly from the upper edges of the rear and end walls, is provided with handles 68 and 70.

A water tank, open at the upper end, is positioned adjustable in the center of the fire-box, and the tank, which is formed with side walls 72 and end walls 74 is secured in position by a clamp 76 in the outer leg of which is a thumb screw 78. Water vapor from the tank provides moisture for products being barbecued.

Figure 2:
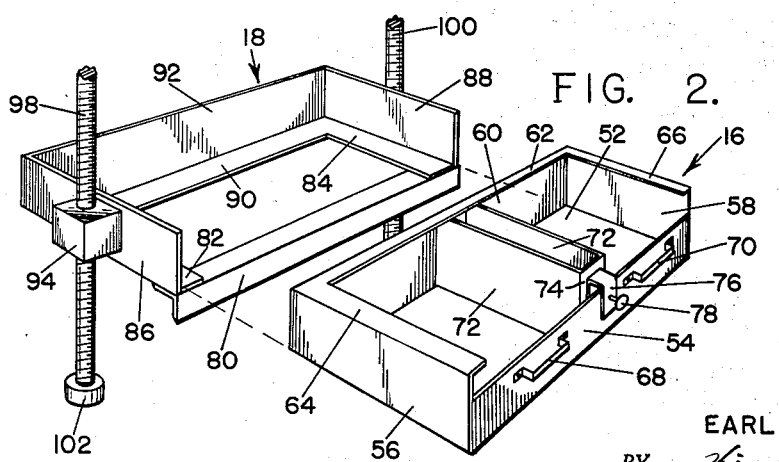
Figure 2 is a perspective view of the fire-box or pan, and also showing a tray for supporting the fire-box in the housing of the device.

The fire-box 16 is freely positioned in the tray 18 and, as shown in Figure 2, the tray is formed with L-shaped end members and an L-shaped side, and the ends of the end members are connected with an angle bar 80 on the open side of the tray. The fire-box rests upon flanges 82 and 84 of the end members 86 and 88 and the flange 90 of the side 92. The ends 86 and 88 are provided with lugs 94 and 96 through which rods 98 and 100 are threaded and the lower ends of the rods are rotatably mounted in sockets 102 and 104 positioned on horizontal legs 106 of the angle bars 50. The sockets 102 and 104 are secured, such as by welding, to the angle bars. The upper ends of the rods 98 and 100 are rotatably mounted in bearings 108 and 110, which extend from the end panels 44 and 46, and bevel gears 112 and 114 on upper ends of the rods mesh with similar gears 116 and 118 on a longitudinally disposed shaft 120 which is rotatably mounted in bearings 122 and 124 on the inner surfaces of the panels. One end of the shaft 120 extends through the panel 46 and the extended end is provided with a hand crank 126 by which the shaft is rotated to adjust the elevation of the tray 18 and fire-box 16.

A warming tray 128 is positioned in the upper part of the housing and the tray is supported by angle bars 130 and 132 on the inner surfaces of the panels 44 and 46. The tray may be secured to the angle bars and the bars to the panels by welding or other suitable means.

Figure 4:
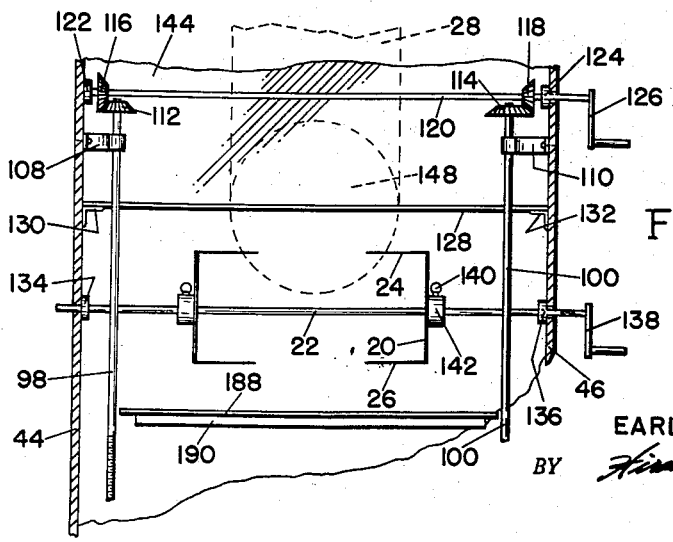
Figure 4 is a vertical section through the intermediate part of the housing, with the parts shown on an enlarged scale, illustrating the mounting of the hand cranks, gears, and shafts for actuating the spits and elevation of the fire-box.

The shaft 22 upon which the spit 20 is positioned is rotatably mounted in bearings 134 and 136 on the end panels 44 and 46, and the ends of the shaft extend through the panels, as shown in Figure 4. A hand crank 138 is removably mounted on one end of the shaft, and the spit 20 is secured to the shaft by a set screw 140 that is threaded in a hub 142 from which the prongs of the spit extend. In the design shown two spits are provided on the shaft and it will be understood that one, or any number of spits may be provided as may be desired. With the spit mounted as illustrated and described the spits and shaft therefor, may readily be removed when it is desired to insert the incinerator basket in the housing.

Figure 3:
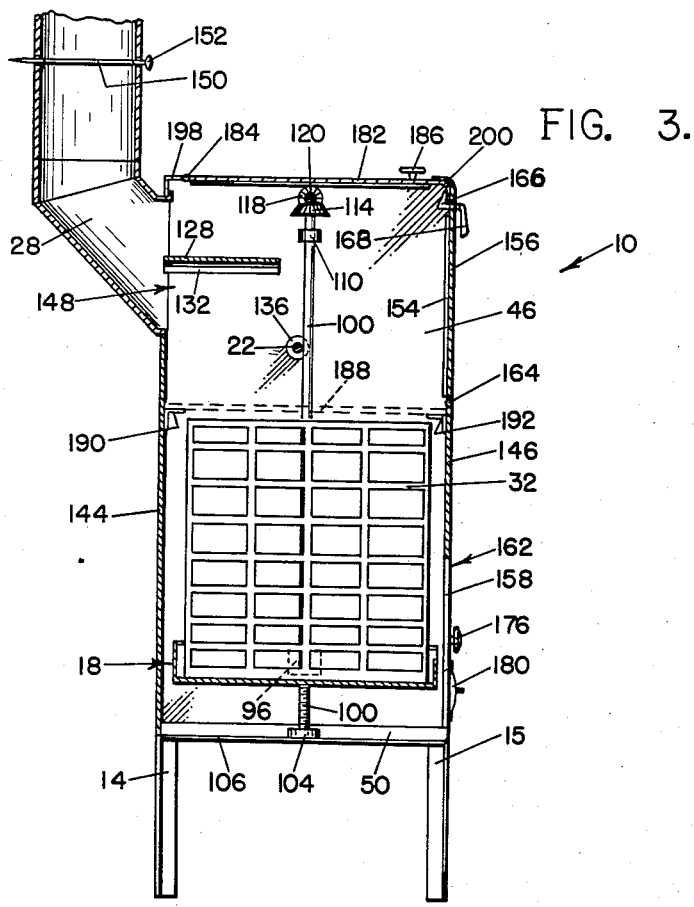
Figure 3 is a vertical section through the combination barbecuer and incinerator taken on line 3—3 of Figure 1, showing the incinerator basket in the housing of the device.

The angle bars 12, 13, 14 and 15, with the connecting cross bars, provide end frames, and the end frames are connected by side panels 144 and 146. The side panel 144 is provided with an opening 148 from which the chimney 28 extends and, as shown in Figures 1 and 3, the chimney is provided with a damper 150 that is adjusted by a handle 152. The side panel 146 is provided with an opening 154 in which an upper door 156 is positioned, and also an opening 158 in which doors 160 and 162 are positioned. The door 156 is mounted in the panel with a piano hinge 164 on the lower edge, and the upper part of the door is provided with a latch 166 that is operated by a handle 168 to secure the door in the closed position. The doors 160 and 162 are mounted at the sides with piano hinges 170 and 172 and these doors are retained in closed positions by latches 174 and 176. The doors 160 and 162 are also provided with draft regulators 178 and 180.

The top, or upper end of the housing is provided with a door 182, one side of which is secured to the housing with a piano or continuous hinge 184, and the opposite side is provided with a latch 186 by which the door is retained in the closed position.

A wire mesh panel providing a grill is also positioned in the housing and, as shown in Figure 3, the grill 188 is freely positioned on angle bars 190 and 192 that are secured to the side panels of the housing by welding, or the like.

The end frame including the angle bars 14 and 15 is provided with triangular-shaped frames 194 which support the shelf or platform 30, and the frames 194 also provide means for mounting a handle 196 on the housing. The handle is secured in ends of the frames and by gripping the handle the legs at the rear of the housing may be raised to facilitate rolling the housing from one position to another.

The incinerator basket 32 may be made of wire mesh, or straps or bars, as shown in Figure 3, and with the spit and shaft therefor removed the basket is readily positioned in the housing.

The housing is preferably made of metal, or other heat resistant material, and the parts are secured together by welding or other suitable means. The doors are mounted by piano or other continuous type of hinges, and metal strips 198 and 200 may be provided at the upper corners of the sides to form stops for the doors.

Although the spit may be turned by the hand crank, it will also be understood that it may be turned by other means.

Operation

With the parts assembled as shown and described a ham, fowl, or other object may be positioned on the spit, and with a fire in the fire-box or pan, and water in the tank the spit is rotated slowly whereby the device is subjected to the heat of the fire from all angles. Products may also be placed on the wire grill, and the distance between the grill or spit and the fire may be adjusted by turning the hand crank at the upper end of the housing.

To use the device as an incinerator the spit and shaft thereof are removed and the incinerator basket positioned in the housing, as shown in Figure 3.

The incinerator basket and spit assembly may also be placed in the housing for storage and shipping.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to in actual practice, if desired.

Having now described the invention that which is claimed to be new and desired to be procured by Letters Patent, is:

1. A portable grill comprising a vertically disposed housing, rectangular-shaped in plan, wheels positioned on one end of the housing, threaded rods rotatably mounted in ends of the housing, a tray having lugs projecting from the ends positioned in the housing with the rods threaded through the lugs, a fire-box positioned in the tray, a water tank in the fire-box, a spit rotatably mounted in the upper part of the housing and spaced from the fire-box, means for rotating the spit, doors hinged to the housing and a chimney extended from the housing.

2. In a barbecuer, the combination which comprises a vertically positioned housing, wheels on one end of the housing, a tray having lugs with internally threaded sockets therein extended from ends thereof positioned in the lower part of the housing, vertically disposed rods rotatably mounted in ends of the housing and threaded through the sockets of the lugs of the tray, a fire pan positioned on the tray, a water tank on the fire pan, a longitudinally disposed shaft in the upper end of the housing and operatively connected to the vertically disposed rods, a hand crank in one end of the shaft for rotating the shaft and rods to elevate and lower the tray and fire pan, a spit removably mounted in the housing and spaced above the fire pan, means for rotating the spit, doors in the housing providing access to the spit, and a chimney extended from the housing.

3. In a barbecuer, the combination which comprises a vertically disposed housing, rectangular-shaped in plan, rollers on one end of the housing, a handle projecting from the end of the housing opposite to the end on which the rollers are positioned, a tray having lugs extended from the ends positioned in the lower part of the housing, vertically disposed rods rotatably mounted in the housing and threaded through the lugs on the ends of the tray, means in the upper end of the housing for rotating the rods to elevate and lower the tray, a fire-box having a water tank thereon positioned on the tray, a horizontally disposed shaft positioned in the upper part of the housing, a spit on the shaft, and means for rotating the shaft.

4. In a barbecuer and incinerator, the combination which comprises a vertically disposed housing, rectangular-shaped in plan and having wheels on one end and a handle extended from the opposite end, said housing having openings therein, doors positioned in the openings of the housing, a tray having lugs projecting from ends thereof positioned in the lower part of the housing, vertically disposed rods rotatably mounted in the housing and threaded through the lugs of the tray for elevating and lowering the tray, means for rotating the rods, an open fire-box freely positioned on the tray, a water tank in the fire-box, the fire-box providing a drawer and having handles on the outer surface, a spit in the housing and spaced above the fire-box, and means for rotating the spit.

References Cited in the file of this patent

UNITED STATES PATENTS

| | | |
|---|---|---|
| 42,935 | Fares et al. | May 31, 1864 |
| 143,693 | Hathaway | Oct. 14, 1873 |
| 246,292 | Compton | Aug. 30, 1881 |
| 563,332 | Taylor et al. | July 7, 1896 |
| 948,717 | Avery | Feb. 8, 1910 |
| 1,160,256 | Burg | Nov. 16, 1915 |
| 2,114,698 | Babin | Apr. 19, 1938 |
| 2,398,508 | Shoemaker | Apr. 16, 1946 |
| 2,484,239 | Moon et al. | Oct. 11, 1949 |
| 2,507,243 | Boyd et al. | May 9, 1950 |
| 2,526,686 | Rasmussen | Oct. 24, 1950 |
| 2,573,115 | Sisto | Oct. 30, 1951 |
| 2,600,234 | Foley | June 10, 1952 |
| 2,608,190 | Winning et al. | Aug. 26, 1952 |
| 2,626,559 | Rau | Jan. 27, 1953 |
| 2,691,368 | Hood | Oct. 12, 1954 |
| 2,748,691 | Johnson | June 5, 1956 |
| 2,783,705 | Vrionis | Mar. 5, 1957 |
| 2,826,984 | Krull | Mar. 18, 1958 |